T. A. KELLETT.
CAMERA-OBSCURA.

No. 170,271.  Patented Nov. 23, 1875.

Fig. 1.

Fig. 2.

WITNESSES.  INVENTOR.

UNITED STATES PATENT OFFICE.

THOMAS A. KELLETT, OF WELLS, MINNESOTA, ASSIGNOR OF ONE-HALF HIS RIGHT TO T. S. FELLOWS, OF SAME PLACE.

IMPROVEMENT IN CAMERA-OBSCURAS.

Specification forming part of Letters Patent No. 170,271, dated November 23, 1875; application filed September 28, 1875.

*To all whom it may concern:*

Be it known that I, THOMAS A. KELLETT, of Wells, in the county of Faribault and State of Minnesota, have invented certain new and useful Improvements in Painters' Outlining-Camera; and I do hereby declare the following to be a full, clear, and exact description of the invention, such as will enable others skilled in the art to which it pertains to make and use it, reference being had to the accompanying drawings, which form part of this specification.

The nature of my invention consists in an adjustable table, in combination with a reflector and camera, by which a small picture placed on the table can be adjusted in suitable position under the reflector to be presented to the camera, so as to obtain an image of the picture direct and enlarged to any required size for painting on a canvas behind the camera by the aid of natural or artificial light, as will be hereinafter more fully set forth.

The accompanying drawing, to which reference is made, fully illustrates my invention.

A represents a board or plate of any suitable dimensions, through the upper part of which is passed a camera, B. The outer or front part of this camera is covered by a hood, c, in which is a reflector, D, standing at an angle of forty-five degrees with the camera. Below the hood and camera is an adjustable table, G, upon which the photograph is to be placed. This table is parallel with the axis of the camera-tube, and at an angle of forty-five degrees with the reflector. It is adjusted horizontally out and in on a support, E, by means of a screw, a, and the support E is adjusted vertically up and down in a gate, H, and held at any point desired thereon by a set-screw, b. The gate H is adjusted laterally in guides K and L on the front of the plate A, and held by a set-screw, d. In the plate A is a mortise covered by a door, I, through which access is had to the set-screws a and b, as shown.

The photograph or other picture is to be secured to the table G, so that it will present a plane surface to the reflector. Then, to obtain a life-sized image of this photograph, adjust the table in the center of the instrument by means of the set-screw d. Then, by means of the set-screw b, adjust the support or bracket E so that the table will be three and one-half inches below the hood containing the reflector, and then draw the table back by means of the set-screw a until it touches the gate or slide H.

The camera-tube should extend through the back plate of the hood one inch and a half toward the reflector.

The instrument thus arranged is placed in a mortise made in a dark shutter in a window upon which the sun shines, so that the sunshine may fall directly on the photograph. If the hood casts its shadow on the photograph the sun is too far above the horizon, and the image will not be as bright as it should be.

The mortise in the window-shutter should be of proper dimensions to receive the instrument, the hood and table projecting on the outside thereof.

A painter's canvas, sheet of drawing-board, or white screen of the desired size is placed in the room, so that its plane shall be perpendicular to the axis of the camera-tube, its center on a level with the tube, and about forty-two and one-half inches from the back lens of the same. Now, exclude all light from the room except that admitted through the lens, when a life-sized image of the photograph will be seen on the canvas. If the image be too low on the canvas, turn the screw a, so as to carry the table farther from the operator until the image is raised to the desired height on the canvas.

With a drawing or crayon pencil an outline of the image may be drawn by tracing the prominent lines as they appear on the canvas.

To increase the size of the image, as when a life-sized painting of a smaller photograph is desired, raise the table nearer to the hood, and remove the canvas farther from the lens until the right focus is obtained. If the image be too large, reverse the movement. A point one side of the center of the table may be brought under the center of the reflector by the set-screw d. Should the reflector be injured it may be removed and replaced by another by taking off the top of the hood.

Having thus fully described my invention, what I claim as new, and desire to secure by Letters Patent, is—

1. The combination of a table, a mirror or reflector, and a camera, by which a direct image of any desired size for painting, of any photograph or other picture placed on the table, may be shown upon a canvas placed at a correct focal distance behind the lens, substantially as herein set forth.

2. In combination with the camera B and reflector D, the adjustable table G, bracket E, slide H, and set-screws $a$ $b$ $d$, whereby the table may be adjusted in any direction, as herein set forth.

In testimony that I claim the foregoing I have hereunto set my hand this 18th day of September, 1875.

THOMAS A. KELLETT.

Witnesses:
  GEO. A. BARNES,
  H. L. TERRY.